United States Patent [19]

Sclippa

[11] 4,062,259
[45] Dec. 13, 1977

[54] HIGH CUTTING SPEED FLYING SHEAR MACHINE

[75] Inventor: Ferruccio Sclippa, Udine, Italy

[73] Assignee: Simac S.p.A., Tarcento (Udine), Italy

[21] Appl. No.: 732,148

[22] Filed: Oct. 13, 1976

[30] Foreign Application Priority Data

Oct. 13, 1975 Italy ................................. 83457/75

[51] Int. Cl.² ........................................... B23D 25/12
[52] U.S. Cl. ...................................... 83/285; 83/303; 83/306
[58] Field of Search ................. 83/285, 303, 306, 307

[56] References Cited

U.S. PATENT DOCUMENTS

| 2,588,581 | 3/1952 | Sieger | 83/303 |
| 3,834,260 | 9/1974 | Sievrin | 83/303 X |

*Primary Examiner*—J. M. Meister
*Attorney, Agent, or Firm*—Browdy and Neimark

[57] ABSTRACT

A first shear-unit is essentially combined with at least one second shear-unit of the same type in a parallel way or in series, to form one single shear machine, wherein the cutting of an advancing bar is alternately at one or the other shear and for this purpose employing a bar-deviator, which is mounted upstream of these shears.

20 Claims, 9 Drawing Figures

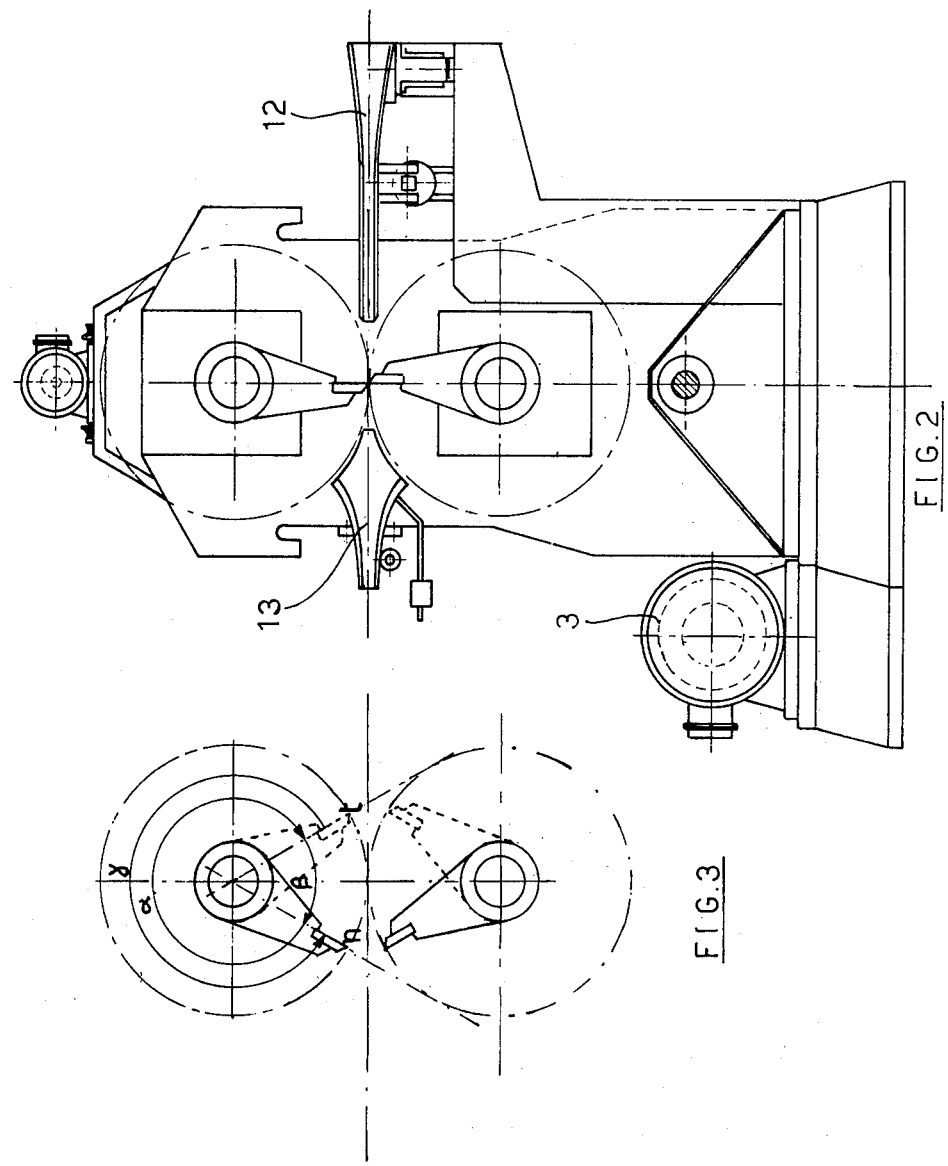

HIGH CUTTING SPEED FLYING SHEAR MACHINE

BACKGROUND OF THE INVENTION

1. Field of the invention.

The present invention relates to a shearmachine for preferentially fly-cutting with high speed of advancing bars and more particularly to the composition of said machine with parallel and/or shear-units with alternating combined action. Both the grouping of shears of this type as well as the respective installations form the object of the present invention, which is particularly useful for the high speed cutting of bars or like products of lamination.

2. Description of The Prior Art.

The shears for rolled products in use at the present time, which consist generally of two rotating knives, present obvious limitations as far as the cutting speed is concerned.

The fact is well known that the shearing is assured by way of two knives, rotating in opposite directions, and the cuttingspeed of these knives at the cutting instant equals the forward speed of the bar at the instant of the cutting itself.

With each cut of the knives, the machine produces a bar of the desired length. It is evident that with this method the knives have in one turn to start from the beginning, accelerate to the exit speed of the laminated bar, cut the bar, decelerate and stop at the position where the cycle begins, in the vertical point over the cutting area.

The accelerations and the decelerations take place in an angular space, not more than 180°, since at the utmost, a half turn is used for the deceleration and a half turn for the acceleration, but in reality, the spaces for deceleration and acceleration do normally not exceed 150° – 160°, and it is evident, that for a certain distance the knives have to rotate in the cutting area at a constant speed. Because of the limited spaces allowed for the acceleration and the deceleration, these machines have to be constructed in a very strong way. However this massive construction creates a greater inertness, and therefor the speed can not be increased, unless the knife supports are not lightened. The gears and all the elements in movement are to compromise the consistency of the machine itself.

Since it is not conveniently possible to increase the acceleration and the deceleration of the knives, which are already at their limits, the problem of the high cutting speed can only be solved by increasing the acceleration space, which is impossible with the present cutting system, because the angle of the turn for the knife is completely taken up, at the utmost half of it for the acceleration and half of it for the deceleration.

SUMMARY OF THE INVENTION

The system of the present invention determines a remarkable increase of the rotation speed of the knives, and consequently of the cutting speed of the bar, which with this system may travel at a maximum speed and precisely to execute acceleration and deceleration spaces for the cutting knives, which are considerably larger than the ones used in the prior art.

For this purpose the present invention is composed of at least two shears, each shear consisting of a couple of opposed cutting knives. The shears are parellelly arranged, one opposite the other, or in series, one behind the other and alternate in the process of cutting with the use of a bar deviator.

However, the coupling of the two traditional shears parallel or in series, dividing in halves the work of each single shear, does not permit reaching the demanded increase of the cutting-speed, because the endspeed of the knives, which start from the stopping point, over a path of ca. 150° – 160°, at the utmost 180° and vice versa, has a limit, which can not easily be exceeded, and which is determined by the limit of the acceleration and the deceleration that may be maintained.

According to the present invention, the operating movement of the knives of the shears is therefore in such a way modified, that the acceleration and/or deceleration of the knives tend to the limited space of the angle of the turn, which will give a doubling of the space for the acceleration and deceleration of same, with the consequence of increasing the peripheral speed of same of about 40%, and this fact will create an analogous productivity increase of the plant. The purpose is essentially achieved by the fact that the time required to reach this new speed, which is at least 40% higher, is recovered by the presence of at least one second shear, as already said, in parallel or in series.

The doubling of the space for acceleration and deceleration is effected according to the first preferential embodiment of the invention, with the repositioning of the knives to the point of stoppage, which for the purpose of the present invention is not situated at the opposite end of the cutting band, which is the case with the traditional shears, but immediately after the end of this phase, and more precisely as soon as the opposite knives start to detach themselves, after they have effected the cutting of the bar, and when they assume a reciprocal distance between the points, which are not inferior to the depth of the cut bar. However to let it pass, this way the knives dispose of nearly an angle turn for the acceleration for the new cut, which starts from the stop and reaches the requested increase of the speed in the double space.

As far as the deceleration is concerned, to reach this cutting speed and effect the cutting itself in the said cutting area, it will be realized in an analogous space in a way that immediately before the said cutting area the relocationing of the knives will be effected by the inversion of the knife rotation in order to bring them to the starting point, immediately at the beginning of the cutting area.

In a second embodiment the knives continue with their turn of deceleration until they have reached the complete 360°, passing the cutting area, and then stopping always immediately at the end of the cutting area. It is intended, that during this phase the bar will be deviated to the other shear and than returned to the first one.

In a third embodiment, after the knives have stopped before the said cutting area, they will wait for the deviation of the bar and its exit from the cutting area before continuing towards the established stop, immediately at the end of the said cutting area.

It is obvious that in the first embodiment as well as in the second and third one, at least two shears will be necessary to allow the recovery of the maximum times required, in order to have the knives reach the speed equal to the acceleration and deceleration, and this only, which is well understood, with the first embodiment, when the cutting length of the bars is so short, so it can not be accepted during the major passive time of the cycle possible, but instead, when the bar has a sufficient length, a single shear may easily be used.

In practice, if the angle for the run of the knife carrier may be considered in the proximity of 30% - 40%, the starting position of the knife would be right after the end of the cutting phase, and this way the present invention realizes, that the knife in the said position will dispose of ca. 320° - 330° for the acceleration and the same goes for the deceleration.

The increase of the peripheral speed of the knives may be achieved with this system, considering the movement to which they are both equally subjected, the accelerated and the decelerated, and if some numerical examples are studied, it will be understood, that with the parity of the acceleration and doubling of the available space, a speed "V" could be reached, equal to 1.41 times the speed that can be reached with the traditional machines, and the same goes for the increase of the production of the plant. On the contrary, as said before, this gives an increase of the time for the cycle of the knives, which may be neglected, because the operating knives have more or less long dead times, which depend on the length of the bars.

Also the execution costs are not too high, since the construction scheme as well as the driving system may be of the traditional type.

In case of the adoption of for instance two parallel shears, the plant will not have to be substantially modified, because the bar deviator, which is required on the upstream of the cutting area, would have however to be employed on the upstream of the distributor of the bars in the cooling plate.

BRIEF DESCRIPTION OF THE DRAWINGS

The present invention will be better understood with the help of the enclosed drawings, wherein some executions of the action are reported; according to the present invention these illustrations show simplified preferred embodiments, which on the other hand are not limiting.

FIG. 2 is a right side elevational view of a shear, according to FIG. 1 with the deviator device, in order to deviate the bar alternately to each of two opposed shears.

FIG. 3 illustrates the characteristic positions and the angular spaces of the various phases of the work of a pair of knives of each shear.

DETAILED DESCRIPTION OF PREFERRED EMBODIMENTS

Figure 1:
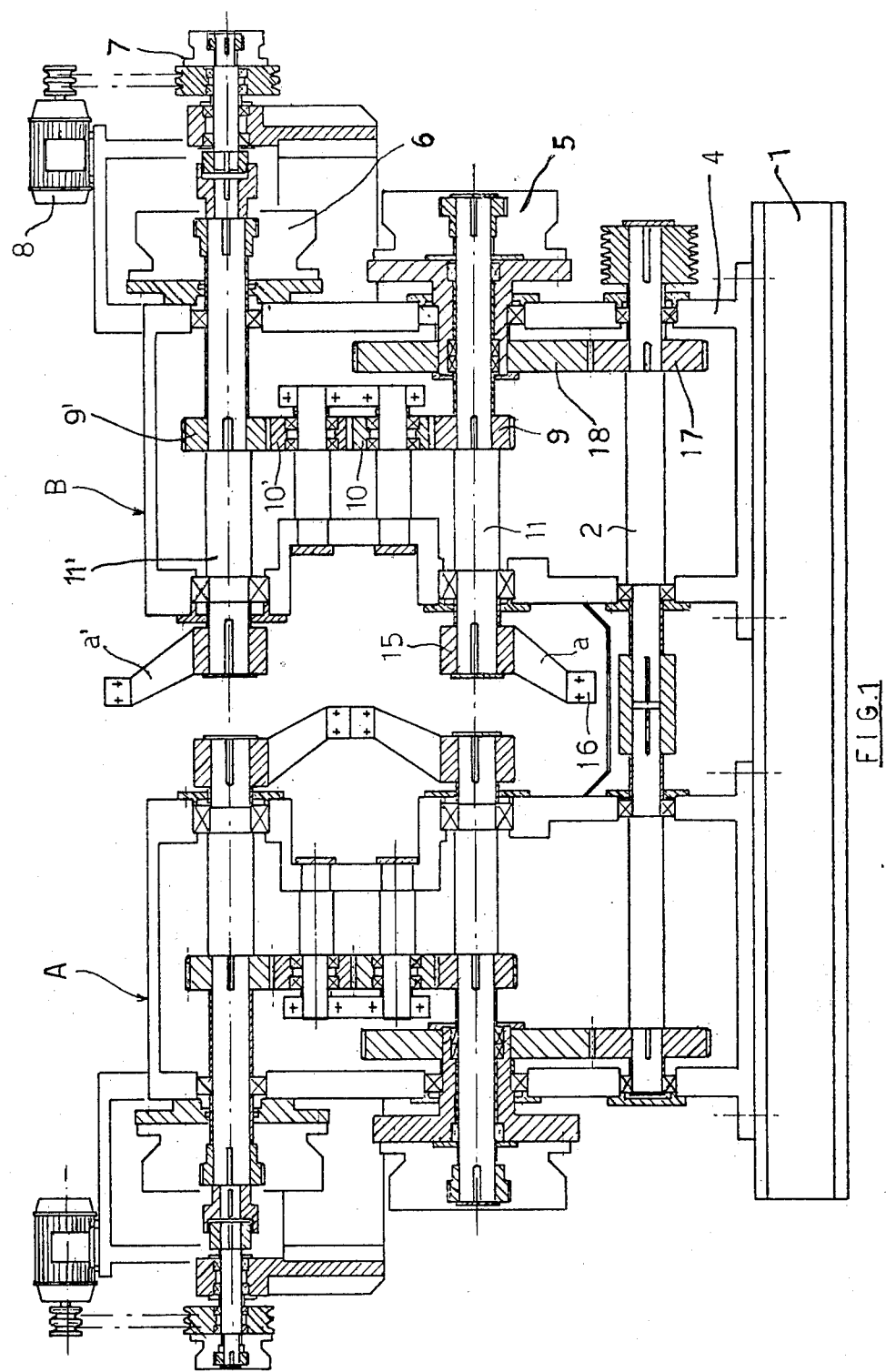
FIG. 1 is a transverse cross-sectional view of two shears parallelly opposed one to another, to form a single shear machine complex, wherein the knife carriers are designed for their replacement and maintenance.
Figure 4:
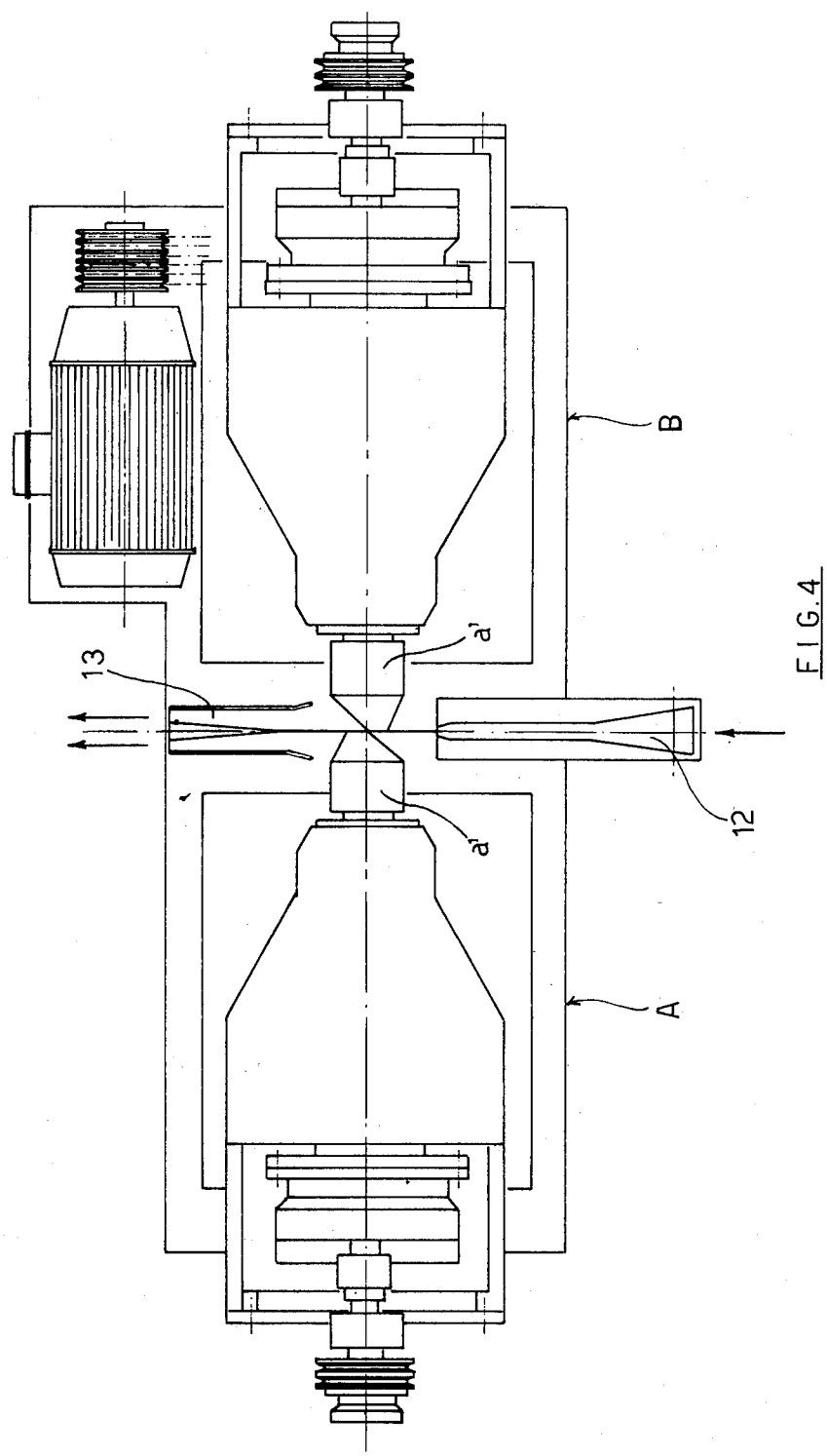
FIG. 4 is a top plan view of the complex of FIGS. 1 and 2.

According to the invention and to conform with a first embodiment, which is represented in FIGS. 1,2,3 and 4, the machine consists of two shear-units (A and B), arranged on a single frame and started by way of a transmission, which is situated in the lower part 2 and driven by a single engine 3 and controlled by a single electronic panel (not illustrated) in order to form a single shear machine complex.

Each shear-unit is made up of a holding and supporting box 4, wherein the elements of operation and of the transmission are arranged, the latter consisting of two knife carrier axles 11—11' on which operate respectively the clutch 5 and the brake 6. The two axles are connected with each other by way of the gears 9—9' and 10—10', the first ones being integral and coaxial with the respective axles 11—11' and the second ones being intermediate, in order to have the knives rotate in the same direction and at the same number of turns in perfect synchronism.

At the axle 11' equipped with the brake 6 also operates a second clutch 7, driven by a small supplementary engine 8 for the recovery of the position of the knives a, a', which consist of the knife carrier 15 and the knives themselves 16.

The knife carriers 15 are shaped in such a way, so they have a distance from the frontal knifecarrier which is sufficient for the replacement passage, and an action field in relation to the exact opposite adjoining knives.

The movement of the axle 11 and consequently of the axle 11' is transmitted by way of the toothwheels 17, 18, the first one coaxial and integral with the main transmission shaft 2 and the second one engaged with the first one coaxial, integral or loose through clutch 5 with the shaft 11.

To achieve the alternating action of the two shears, the machine is furnished with a bar deviator, which consists of a tube 12, that can be orientated and a two-way collector 13.

The machine is controlled by way of automatic, mechanical or electromechanical or electronic elements or photocells, not illustrated and well known in the art, operating as follows:

The bar enters the tube of the deviator 12 and is picked up by a photocell, which gives the signal to the shear-unit (A) and the tube of the deviator is oriented toward the knives of shear unit (A). This way the clutch 5 is set in motion and transmits this motion to shaft 11 and the shaft 11' of the pair of the respective knives a, a' causes them to effect a rotation in acceleration through an angle ($\alpha$), in this specific case of 330°, to bring them from the starting position (see FIG. 3) to the position for the beginning of the cutting ($t$) in synchronism with the forward feed of the bar. At this point, the knife will have its peripheral speed, equal to that of the laminate and will keep it practically constant for the entire cutting arch ($\beta$), which amounts to approximately 30°. At this instant, the clutch 5 will disconnect and the brake 6 will connect, which operation will stop the knives within the angle ($\alpha$).

Since to accelerate or to decelerate a mass needs the same amount of energy, the knives will stop within the position for the beginning of the cutting ($t$) from where them immediately, with the action of the additional clutch 7 and the small auxilary engine for the positioning 8 the knives will be carried back to a point corresponding to the starting point (n) by a contrary rotation to an angle space γ equal to α.

Succesively or contemperaneously the deviator (not illustrated) will deviate the bar, thanks to the relocation by means of an inversion. This system may also be used for a single shear, without deviation of the bar, but obviously only if the cutting length of the bar allows it.

Naturally the given example is not binding, and the relocationing may as well be conveniently effected by means of hydraulic pistons or with transmissions in derivation with the driving engine.

In a second embodiment, as mentioned before, the repositioning of the knives is provided in the same direction of the rotation. In this case, when the decelerating knives have arrived at the point (t), instead of stopping, they continue in the same direction to point (n), always with the action of the brake 6 and with the restarting of the movement, which is adjusted by means of the clutch 7 and engine 8. Naturally with this solution the dead times are reduced, but during this phase there is an interference in the cutting area which is effected in such a way, that the respective bar would have to be deviated from this area. In a third embodiment, a temporary stop at (t) is provided to wait until the bar is deviated and immediately carried from (t) to (n).

Figure 6:
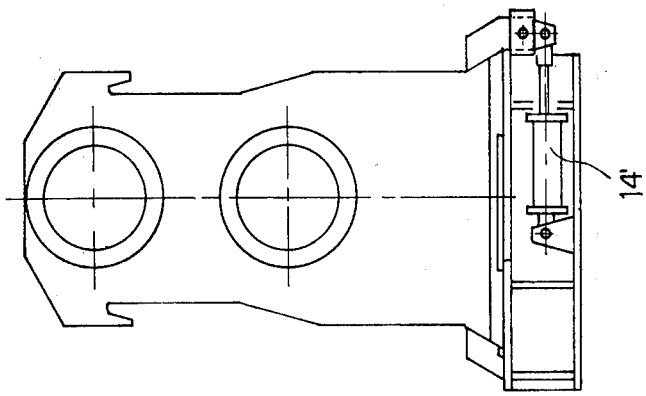
FIG. 6 is a side elevational view of the machine of FIG. 5 illustrating the running elements, applied on one shear for its translation along the operation axle.
Figure 5:
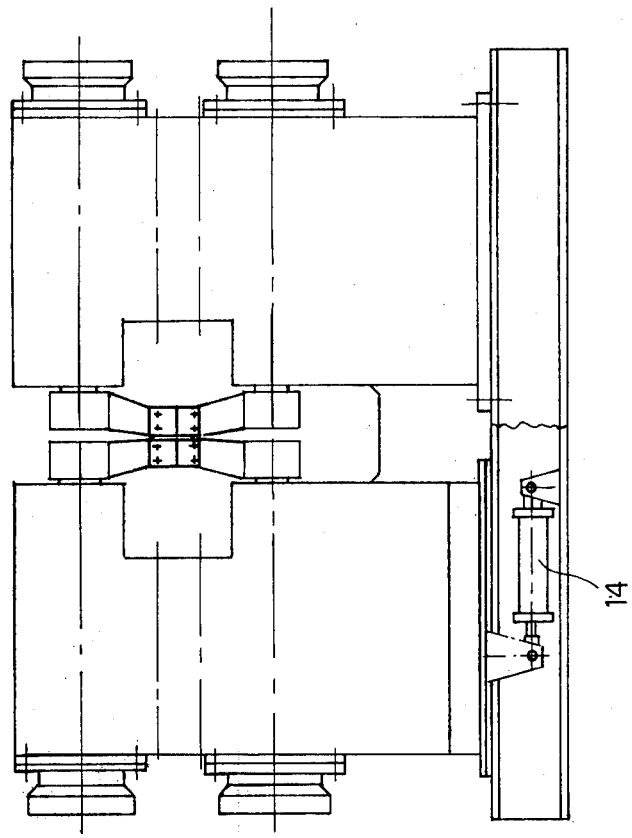
FIG. 5 is a front elevational view of a similar complex, with particular illustration of the assembling of a shear on a slide and the respective displacement elements of the opposite shear for the operation of maintenance and replacement of knives etc.

According to the FIGS. 5,6 two shear units are also provided, which are connected and to position between them, thanks to sliding guides, and to adjust by means of hydraulic cylinders 14, 14' which are situated on the horizontal plane, orthogonally between them in the longitudinal as well as in the transverse direction, in order to translate 14 and stop in position 14'.

Figure 7:
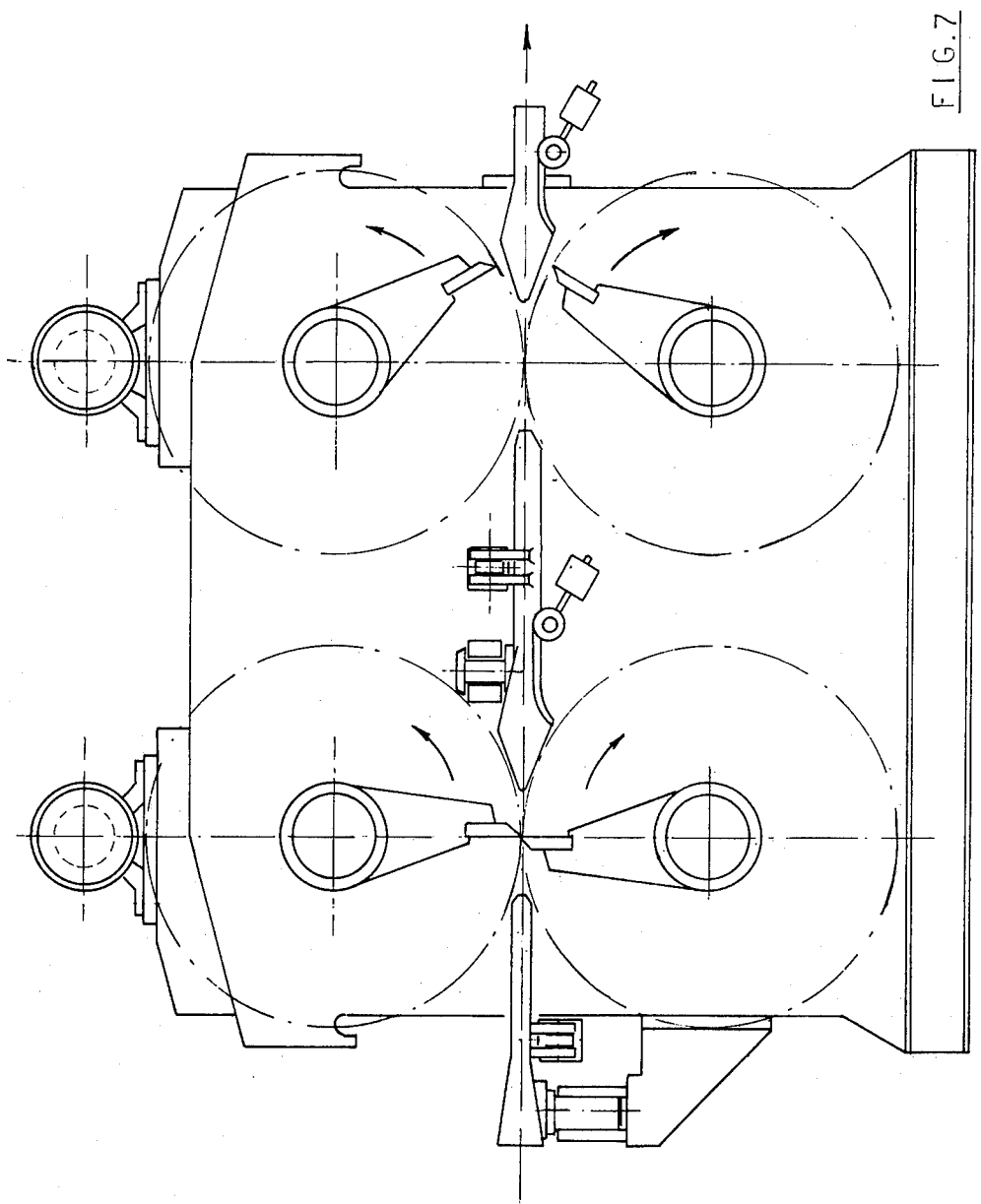
FIG. 7 represents in a side elevational view a unit of two shears in series, which form a single machine complex with two deviators of the bars to be sheared or cut.
Figure 9:
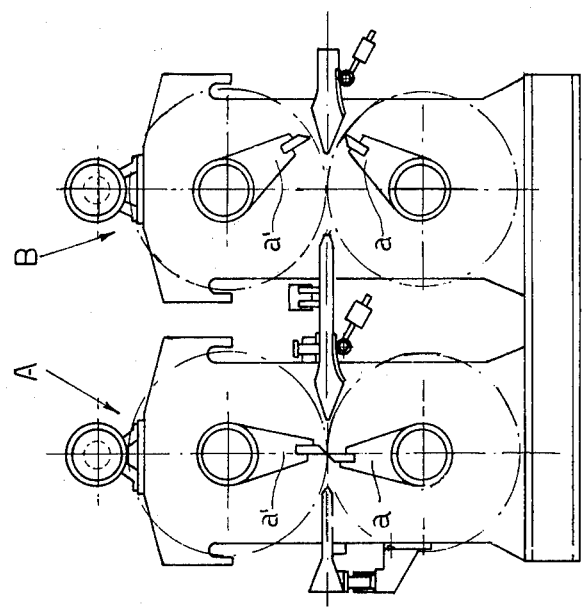
FIG. 9 is a side elevational view of a complex in series, showing the approach of two separate shears of a single shear machine complex.
Figure 8:
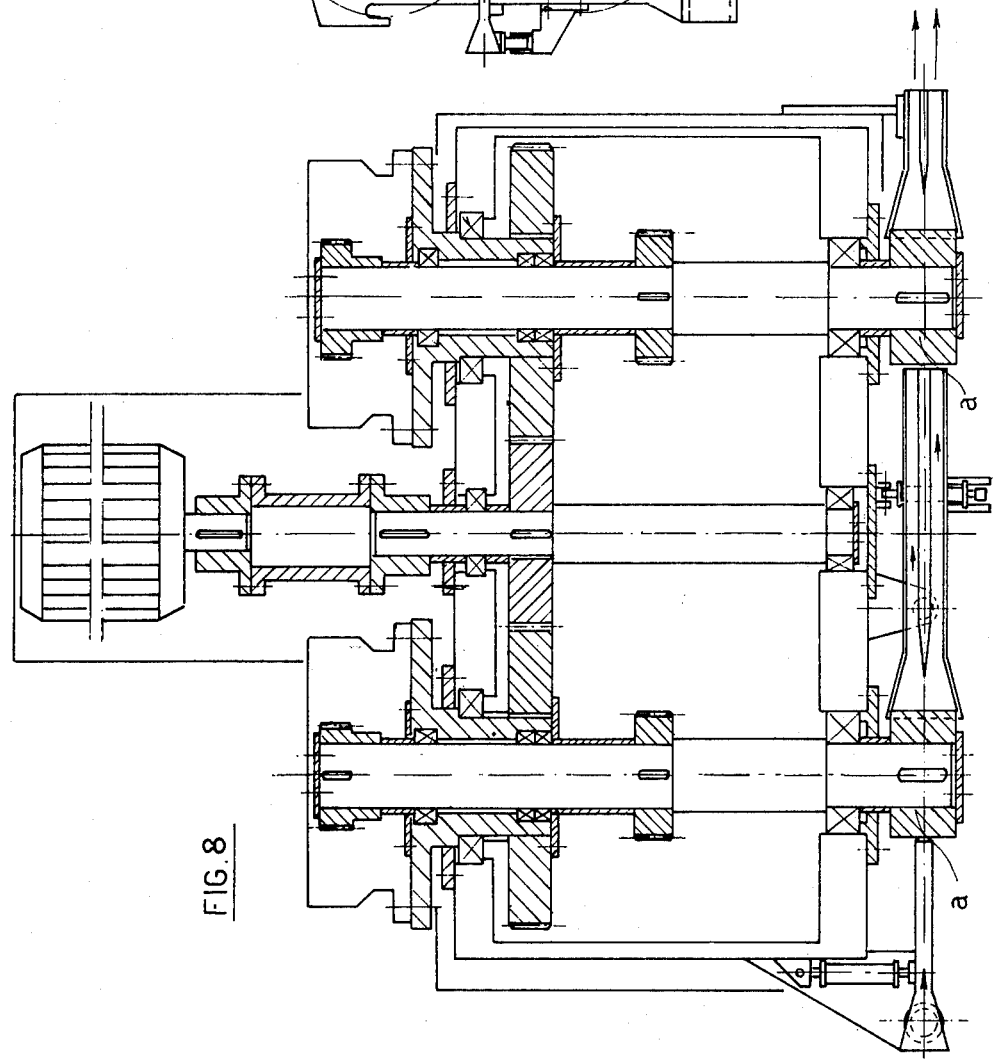
FIG. 8 is a cross sectional top view of the complex of FIG. 7.

The shear coupling in series, as shown in the FIGS. 7, 8 and 9 respectively constitute a single complex machine of two shear devices (FIGS. 7, 8) or a single complex machine of two shear unit machines, put one near the other in series position and disposed on a frame base as in FIG. 9. Other solutions are possible for the opposite rotating knives, with the knives rotating on the horizontal plane or other orientations.

Naturally the present invention is not limited to the described or illustrated examples of execution, but starting from those, there are always other execution forms and methods to realize, and the details may as well vary, without leaving the essence of the invention.

I claim:

1. A complex shear machine for automatic fly-cutting of an advancing bar by means of rotating knives, comprising:
   a single frame;
   two shear units;
   a common drive means for driving both of said shear units; and
   at least one deviator means for deviating the advancing bar alternately to each of said shear units,
   wherein each said shear unit comprises -
      a case;
      two knife carrying axles supported by said case;
      a rotating knife carried by each of said axles in such a manner to permit shearing contact with one another once during each revolution;
      transmission means for transmitting the movement of one axle to the other axle;
      clutch means, connected to one of said axles, for permitting drive transmission from said drive means to said axles;
      brake means connected to one of said axles for braking said axles; and
      repositioning means for repositioning the rotational position of said axles, independent of said drive means,
   whereby, when one said shear unit executes cutting, the other is repositioning the axles thereof to prepare for the successive cutting.

2. A complex shear machine according to claim 1, wherein said two shear units are disposed such that the pairs of rotating knives of each are near one another, parallel opposed, in a position one opposite the other and wherein said deviator means is placed in front of said parallel pairs of rotating knives, in order to receive said advancing bar and to deviate said bar alternately to each pair of said rotating knives to fly-cut said bar at a relatively high speed.

3. A complex shear machine, according to claim 1, wherein said two shear units are disposed such that the pairs of rotating knives of each are near one another, parallel and in serial position, one behind another, and the said deviator means is placed in front of said serial pairs or rotating knives in order to receive said advancing bar and to deviate said bar alternately to different positions of the rotating knives cutting area.

4. A complex shear machine as claimed in claim 1, wherein said repositioning means position said rotating knives, before the beginning of each rotation for each cut, at a starting position located immediately at the end point of the cutting operation area, and wherein said starting position of the knives is selected in such a way that a rotating space of more than 180° is provided for the acceleration of the knives, before each singe cut.

5. A complex shear machine, according claim 4, wherein the acceleration space is about 320° - 340°.

6. A complex shear machine, according to claim 4, wherein the acceleration space is about 360°.

7. A complex shear machine, according to claim 4, wherein said brake means causes said rotating knives to decelerate in a rotating space which exceeds 180°.

8. A complex shear machine, according to claim 5, wherein said brake means causes said rotating knives to decelerate in a rotating space of about 320° - 340°.

9. A complex shear machine, according to claim 6, wherein said brake means causes said rotating knives to decelerate in a rotating space of about 360°.

10. A complex shear machine, according to claim 4, wherein said clutch means permits said knives to accomplish a first phase of acceleration and a second phase of cutting, said brake means causes a third phase of deceleration, to stop at the beginning of the cutting area, and said repositioning means, in a fourth phase, cause the knives to be repositioned to the starting position by reversing the rotating direction thereof by means of a reversing gear and wherein the stoppage of the same for the respective inversion takes place before the interference of said knives with the thickness of the bar that has to be cut, and consequently before entering the operation area for the cutting at the end point of the cutting area.

11. A complex shear machine, according to claim 7, wherein the knives during the deceleration and/or relocationing, are made to continue across the cutting area, said deviator means causing the bar to be deviated to the other cutting area during this time.

12. A complex shear machine, according to claim 10, wherein the third phase of stopping of the knives is accomplished before reaching the cutting area and the movement of the fourth phase takes place in the same direction across the cutting area, for the final relocationing at the said endpoint of said cutting area.

13. A complex shear machine, according to claim 7, wherein said knives for each cutting travel through an angular space of about two turns, one of each includes the major part of the acceleration, the other one the major part of the deceleration.

14. A complex shear machine, according to claim 13, wherein the knives are in acceleration during the entire angular space equal to a turn of the operation arch reduced by the cutting area, and the deceleration takes place at the angular space of an entire turn of the operation arch reduced by the cutting area.

15. A complex shear machine, according to claim 10, wherein the knives accomplish a rotation in the cutting direction equal to two turns reduced by the cutting angle and a rotation for the repositioning opposed to the previous by an angulare space equal to the reduced turn of the cutting angle.

16. A complex shear machine, according to claim 1, wherein said repositioning means includes a small supplementary engine.

17. A complex shear machine according to claim 2, further including a plurality of knife carriers one connecting each of said knives to the respective knife carrying axle, each said knife carrier having a folded arm, which sticks out frontally in such a way, that in the parallel coupling between the opposed axles of the knife carriers remains a space, sufficient for the passing of the arms themselves, without displacement of the shear units.

18. A complex shear machine, according to claim 1, further including additional shear units, which are disposed on slides, which may be adjusted in their position by means of positioning means.

19. A complex shear machine, according to claim 3, wherein said deviator means comprises a bar deviator placed immediately up-stream from the first shear unit which bar deviator orientates the bar alternately in two deviated directions.

20. A complex shear machine, according to claim 19, wherein said deviator means further comprises, between the said two shear units and the corresponding pairs of rotating knives thereof and placed upstream of the second shear unit, a double bar deviator, which consists of two deviation guides, which are placed side by side and united between them, operating in unison with the deviator bar, for a following shear, to convey the cut bars to the following channels.

* * * * *